United States Patent
Negle et al.

(10) Patent No.: US 12,470,467 B2
(45) Date of Patent: Nov. 11, 2025

(54) COMPUTER-IMPLEMENTED DATA STRUCTURE FOR A SERVICE INSTANCE OBJECT AND RELATED METHODS AND NETWORK NODE DEVICES

(71) Applicant: Nokia Technologies Oy, Espoo (FI)

(72) Inventors: Klaus Negle, Munich (DE); Stephen Mwanje, Munich (DE); Uwe Rauschenbach, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 51 days.

(21) Appl. No.: 18/562,085

(22) PCT Filed: May 18, 2021

(86) PCT No.: PCT/EP2021/063038
§ 371 (c)(1),
(2) Date: Nov. 17, 2023

(87) PCT Pub. No.: WO2022/242828
PCT Pub. Date: Nov. 24, 2022

(65) Prior Publication Data
US 2024/0243981 A1      Jul. 18, 2024

(51) Int. Cl.
*H04L 41/50*    (2022.01)
*H04L 41/5009*  (2022.01)

(52) U.S. Cl.
CPC ...... *H04L 41/5096* (2013.01); *H04L 41/5009* (2013.01)

(58) Field of Classification Search
CPC .................. H04L 41/5096; H04L 41/5009
See application file for complete search history.

(56) References Cited

U.S. PATENT DOCUMENTS

| | | | |
|---|---|---|---|
| 9,792,163 B1* | 10/2017 | Chrysanthakopoulos | ................... G06F 3/0608 |
| 2010/0322246 A1* | 12/2010 | Rinne | ................... H04L 1/0082 370/392 |
| 2018/0132138 A1* | 5/2018 | Senarath | ............. H04L 41/0813 |
| 2018/0287894 A1* | 10/2018 | Senarath | ................ H04L 41/40 |
| 2019/0028350 A1* | 1/2019 | Yeung | ................ H04L 41/0893 |

OTHER PUBLICATIONS

"Zero-touch network and Service Management (ZSM); Cross-domain E2E service lifecycle management", ETSI GS ZSM 008, V1.1.1, Jul. 2022, pp. 1-105.
International Search Report and Written Opinion received for corresponding Patent Cooperation Treaty Application No. PCT/EP2021/063038, dated Mar. 23, 2022, 12 pages.
Papazoglou et al., "Service oriented architectures: approaches, technologies and research issues", The VLDB Journal, vol. 16, Mar. 3, 2007, pp. 389-415.

\* cited by examiner

*Primary Examiner* — Jonathan A Bui
(74) *Attorney, Agent, or Firm* — ALSTON & BIRD LLP (57) ABSTRACT

A computer-implemented data structure for a service instance object and related methods and network node devices are disclosed. The computer-implemented data structure for a service instance object of a network and service management system comprises a first data section configured to store general service instance data, a second data section configured to store end-to-end (E2E) service data, a third data section configured to store E2E service process flow specific data, and a fourth data section configured to store management domain specific data.

11 Claims, 7 Drawing Sheets

```
[General Attributes]             [Flow specific Section]              [Transport Domain]
Service Instance ID                [E2E Instantiation]                  <domain specific attributes>
Related Service Model              [E2E Configuration]                  <interface specific attributes>
...                                [E2E Assurance]                      ...
                                     [Quality Management]
[Service Status]                     [Problem Management]             [Core Domain]
log data (instance start,                                               <domain specific attributes>
          modifications, etc.)   [Domain Specific Section]              <interface specific attributes>
<...attributes>                    [RAN Domain]                         ...
                                     <domain specific attributes>
[Service Components]                 <interface specific attributes>  [Cloud Domain]
Sub-service A (ID)                   ...                                <domain specific attributes>
Sub-Service B (ID)                                                      <interface specific attributes>
...                                [Fixed NW Domain]                    ...
                                     <domain specific attributes>
[E2E Policies]                       <interface specific attributes>  [tbd]
Default values from Service Model    ...
Concrete values from Service Order
...
```

COMPUTER-IMPLEMENTED DATA STRUCTURE FOR A SERVICE INSTANCE OBJECT AND RELATED METHODS AND NETWORK NODE DEVICES

RELATED APPLICATION

This application was originally filed as PCT Application No. PCT/EP2021/063038, filed on May 18, 2021, of which is incorporated herein by reference in its entirety.

TECHNICAL FIELD

The disclosure relates generally to service management and, more particularly but not exclusively, to a computer-implemented data structure for a service instance object and related methods and network node devices.

BACKGROUND

Currently, the lifecycle management of a cross-domain end-to-end (E2E) service follows a set of process flows that are defined by European Telecommunications Standards Institute (ETSI) zero-touch network and service management (ZSM). It offers an E2E service management framework that describes architectural components which are loosely coupled. Each process phase needs to invoke several components in terms of E2E service management functionality, and each process interacts with its management domain counterparts.

However, at least in some situations each process phase of the service lifecycle management may require a dedicated, service specific setup. Accordingly, at least in some situations there is a need for service instance specific configuration/setup data, e.g., policies to manage the service assurance. Currently, the service specific parameters are distributed, typically stored and managed per functional block.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a computer-implemented data structure for a service instance object of a network and service management system comprises:
  a first data section, configured to store general service instance data;
  a second data section, configured to store end-to-end, E2E, service data;
  a third data section, configured to store E2E service process flow specific data; and
  a fourth data section, configured to store management domain specific data.
The E2E service process flow specific data comprises data related to an E2E service management procedure associated with the E2E service process flow. The management domain specific data comprises data related to a management domain.

In an example embodiment, alternatively or in addition to the above-described example embodiments, the general service instance data comprises at least one: service instance object administration data, a link to a service model, or a link to a service order.

In an example embodiment, alternatively or in addition to the above-described example embodiments, the E2E service data comprises data related to at least one: a service policy, a service level agreement, a key performance indicator, or a service component.

In an example embodiment, alternatively or in addition to the above-described example embodiments, the computer-implemented data structure is configured to be stored in a cross-domain data services entity of the network and service management system.

In an example embodiment, alternatively or in addition to the above-described example embodiments, the E2E service management procedure associated with the E2E service process flow comprises at least one of: E2E service instantiation, E2E service configuration, E2E service activation, E2E service quality management, E2E service problem management, E2E service scaling, or E2E service optimization.

In an example embodiment, alternatively or in addition to the above-described example embodiments, the management domain comprises at least one of: a radio access network management domain, a fixed network management domain, a transport network management domain, a core network management domain, a cloud service management domain, or an edge management domain.

An example embodiment of a method of maintaining a service instance object of a network and service management system comprises:
  receiving, at a processor, a request to instantiate a cross-domain end-to-end, E2E, service; and
  in response, generating, by the processor, a service instance object associated with the requested cross-domain E2E service, the service instance object conforming to a computer-implemented data structure comprising:
    a first data section, configured to store general service instance data;
    a second data section, configured to store E2E service data;
    a third data section, configured to store E2E service process flow specific data comprising data related to an E2E service management procedure associated with the E2E service process flow; and
    a fourth data section, configured to store management domain specific data comprising data related to a management domain, and
  initializing, by the processor, the generated service instance object based on initialization data included in the received request.

In an example embodiment, alternatively or in addition to the above-described example embodiments, the method further comprises causing, by the processor, the initialized service instance object to be stored in a cross-domain data services entity of the network and service management system.

In an example embodiment, alternatively or in addition to the above-described example embodiments, the initialization data comprises at least one of: at least one default parameter of a service model of the cross-domain E2E service, or at least one dedicated value for the cross-domain E2E service instance.

An example embodiment of a method of utilizing a service instance object at an end-to-end, E2E, service management entity of a network and service management system comprises:

causing, by a processor, a request to initiate a cross-domain E2E service to be transmitted to a management domain entity, the request comprising a reference to a service instance object associated with the cross-domain E2E service, the service instance object conforming to a computer-implemented data structure comprising:

a first data section, configured to store general service instance data;

a second data section, configured to store E2E service data;

a third data section, configured to store E2E service process flow specific data comprising data related to an E2E service management procedure associated with the E2E service process flow; and         a fourth data section, configured to store management domain specific data comprising data related to a management domain, and     receiving, at the processor, acknowledgement information from the management domain entity, the acknowledgement information comprising information related to at least one service action performed by the management domain entity based on the transmitted request to initiate the cross-domain E2E service.

In an example embodiment, alternatively or in addition to the above-described example embodiments, the method further comprises causing, by the processor, the service instance object to be updated based on the received acknowledgement information.

An example embodiment of a method of utilizing a service instance object at a management domain entity of a network and service management system comprises:

receiving, at a processor from an end-to-end, E2E, service management entity, a request to initiate a cross-domain E2E service, the request comprising a reference to a service instance object associated with the cross-domain E2E service, the service instance object conforming to a computer-implemented data structure comprising:

a first data section, configured to store general service instance data;

a second data section, configured to store E2E service data;

a third data section, configured to store E2E service process flow specific data comprising data related to an E2E service management procedure associated with the E2E service process flow; and         a fourth data section, configured to store management domain specific data comprising data related to a management domain,     accessing, by the processor, service instance data in the referred service instance object; and     performing at least one service action based on the accessed service instance data.

In an example embodiment, alternatively or in addition to the above-described example embodiments, the method further comprises causing, by the processor, acknowledgement information to be transmitted to the E2E service management entity, the acknowledgement information comprising information related to the performed at least one service action.

In an example embodiment, alternatively or in addition to the above-described example embodiments, the method further comprises causing, by the processor, the service instance object to be updated based on the performed at least one service action.

An example embodiment of a network node device associated with an end-to-end, E2E, service management entity of a network and service management system comprises at least one processor and at least one memory including computer program code. The at least one memory and the computer program code are configured to, with the at least one processor, cause the network node device to at least perform:

receiving a request to instantiate a cross-domain E2E service; and     in response, generating a service instance object associated with the requested cross-domain E2E service, the service instance object conforming to a computer-implemented data structure comprising:

a first data section, configured to store general service instance data;

a second data section, configured to store E2E service data;

a third data section, configured to store E2E service process flow specific data comprising data related to an E2E service management procedure associated with the E2E service process flow; and         a fourth data section, configured to store management domain specific data comprising data related to a management domain, and     initializing the generated service instance object based on initialization data included in the received request.

In an example embodiment, alternatively or in addition to the above-described example embodiments, the at least one memory and the computer program code are further configured to, with the at least one processor, cause the network node device to at least perform storing the initialized service instance object in a cross-domain data services entity of the network and service management system.

In an example embodiment, alternatively or in addition to the above-described example embodiments, the initialization data comprises at least one of: at least one default parameter of a service model of the cross-domain E2E service, or at least one dedicated value for the cross-domain E2E service instance.

In an example embodiment, alternatively or in addition to the above-described example embodiments, the at least one memory and the computer program code are further configured to, with the at least one processor, cause the network node device to at least perform transmitting a request to initiate the cross-domain E2E service to a management domain entity, the request comprising a reference to the service instance object associated with the cross-domain E2E service; and receiving acknowledgement information from the management domain entity, the acknowledgement information comprising information related to at least one service action performed by the management domain entity based on the transmitted request to initiate the cross-domain E2E service.

In an example embodiment, alternatively or in addition to the above-described example embodiments, the at least one memory and the computer program code are further configured to, with the at least one processor, cause the network node device to at least perform updating the service instance object based on the received acknowledgement information.

An example embodiment of a network node device associated with an end-to-end, E2E, service management entity of a network and service management system comprises means for performing:

receiving a request to instantiate a cross-domain E2E service; and in response, generating a service instance object associated with the requested cross-domain E2E service, the service instance object conforming to a computer-implemented data structure comprising:
  a first data section, configured to store general service instance data;
  a second data section, configured to store E2E service data;
  a third data section, configured to store E2E service process flow specific data comprising data related to an E2E service management procedure associated with the E2E service process flow; and
  a fourth data section, configured to store management domain specific data comprising data related to a management domain, and
initializing the generated service instance object based on initialization data included in the received request.

An example embodiment of a computer program comprises instructions for causing a network node device associated with an end-to-end, E2E, service management entity of a network and service management system to perform at least the following:
  receiving a request to instantiate a cross-domain E2E service; and
  in response, generating a service instance object associated with the requested cross-domain E2E service, the service instance object conforming to a computer-implemented data structure comprising:
    a first data section, configured to store general service instance data;
    a second data section, configured to store E2E service data;
    a third data section, configured to store E2E service process flow specific data comprising data related to an E2E service management procedure associated with the E2E service process flow; and
    a fourth data section, configured to store management domain specific data comprising data related to a management domain, and
  initializing the generated service instance object based on initialization data included in the received request.

An example embodiment of a network node device associated with a management domain entity of a network and service management system comprises at least one processor and at least one memory including computer program code. The at least one memory and the computer program code are configured to, with the at least one processor, cause the network node device to at least perform:
  receiving from an end-to-end, E2E, service management entity a request to initiate a cross-domain E2E service, the request comprising a reference to a service instance object associated with the cross-domain E2E service, the service instance object conforming to a computer-implemented data structure comprising:
    a first data section, configured to store general service instance data;
    a second data section, configured to store E2E service data;
    a third data section, configured to store E2E service process flow specific data comprising data related to an E2E service management procedure associated with the E2E service process flow; and
    a fourth data section, configured to store management domain specific data comprising data related to a management domain,
  accessing service instance data in the referred service instance object; and
  performing at least one service action based on the accessed service instance data.

In an example embodiment, alternatively or in addition to the above-described example embodiments, the at least one memory and the computer program code are further configured to, with the at least one processor, cause the network node device to at least perform transmitting acknowledgement information to the E2E service management entity, the acknowledgement information comprising information related to the performed at least one service action.

In an example embodiment, alternatively or in addition to the above-described example embodiments, the at least one memory and the computer program code are further configured to, with the at least one processor, cause the network node device to at least perform updating the service instance object based on the performed at least one service action.

An example embodiment of a network node device associated with a management domain entity of a network and service management system comprises means for performing:
  receiving from an end-to-end, E2E, service management entity a request to initiate a cross-domain E2E service, the request comprising a reference to a service instance object associated with the cross-domain E2E service, the service instance object conforming to a computer-implemented data structure comprising:
    a first data section, configured to store general service instance data;
    a second data section, configured to store E2E service data;
    a third data section, configured to store E2E service process flow specific data comprising data related to an E2E service management procedure associated with the E2E service process flow; and
    a fourth data section, configured to store management domain specific data comprising data related to a management domain,
  accessing service instance data in the referred service instance object; and
  performing at least one service action based on the accessed service instance data.

An example embodiment of a computer program comprises instructions for causing a network node device associated with a management domain entity of a network and service management system to perform at least the following:
  receiving from an E2E service management entity a request to initiate a cross-domain E2E service, the request comprising a reference to a service instance object associated with the cross-domain E2E service, the service instance object conforming to a computer-implemented data structure comprising:
    a first data section, configured to store general service instance data;
    a second data section, configured to store E2E service data;
    a third data section, configured to store E2E service process flow specific data comprising data related to an E2E service management procedure associated with the E2E service process flow; and
    a fourth data section, configured to store management domain specific data comprising data related to a management domain,
  accessing service instance data in the referred service instance object; and performing at least one service action based on the accessed service instance data.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1A:
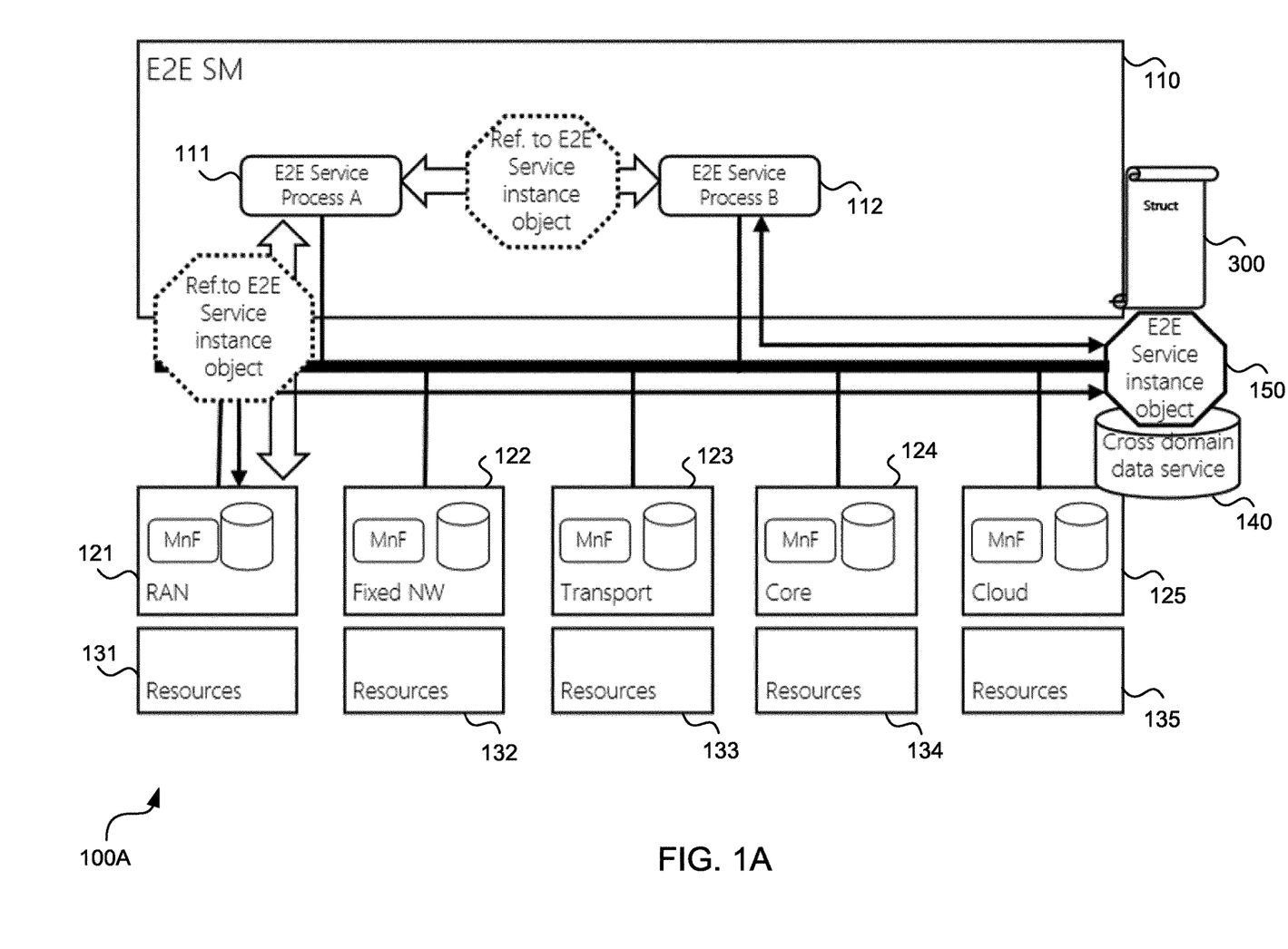
FIG. 1A shows an example embodiment of the subject matter described herein illustrating an example system, where various embodiments of the present disclosure may be implemented.

Diagram 100A of FIG. 1A illustrates an example system, where various embodiments of the present disclosure may be implemented. The system of diagram 100A may comprise a fifth generation (5G) new radio (NR) network. At least in some embodiments, the 5G NR network may comprise one or more massive machine-to-machine (M2M) network (s), massive machine type communications (mMTC) network (s), internet of things (IOT) network (s), industrial internet-of-things (IIoT) network (s), enhanced mobile broadband (eMBB) network (s), ultra-reliable low-latency communication (URLLC) network (s), and/or the like. In other words, the 5G NR network may be configured to serve diverse service types and/or use cases, and may logically be seen as comprising one or more networks.

Figure 1B:
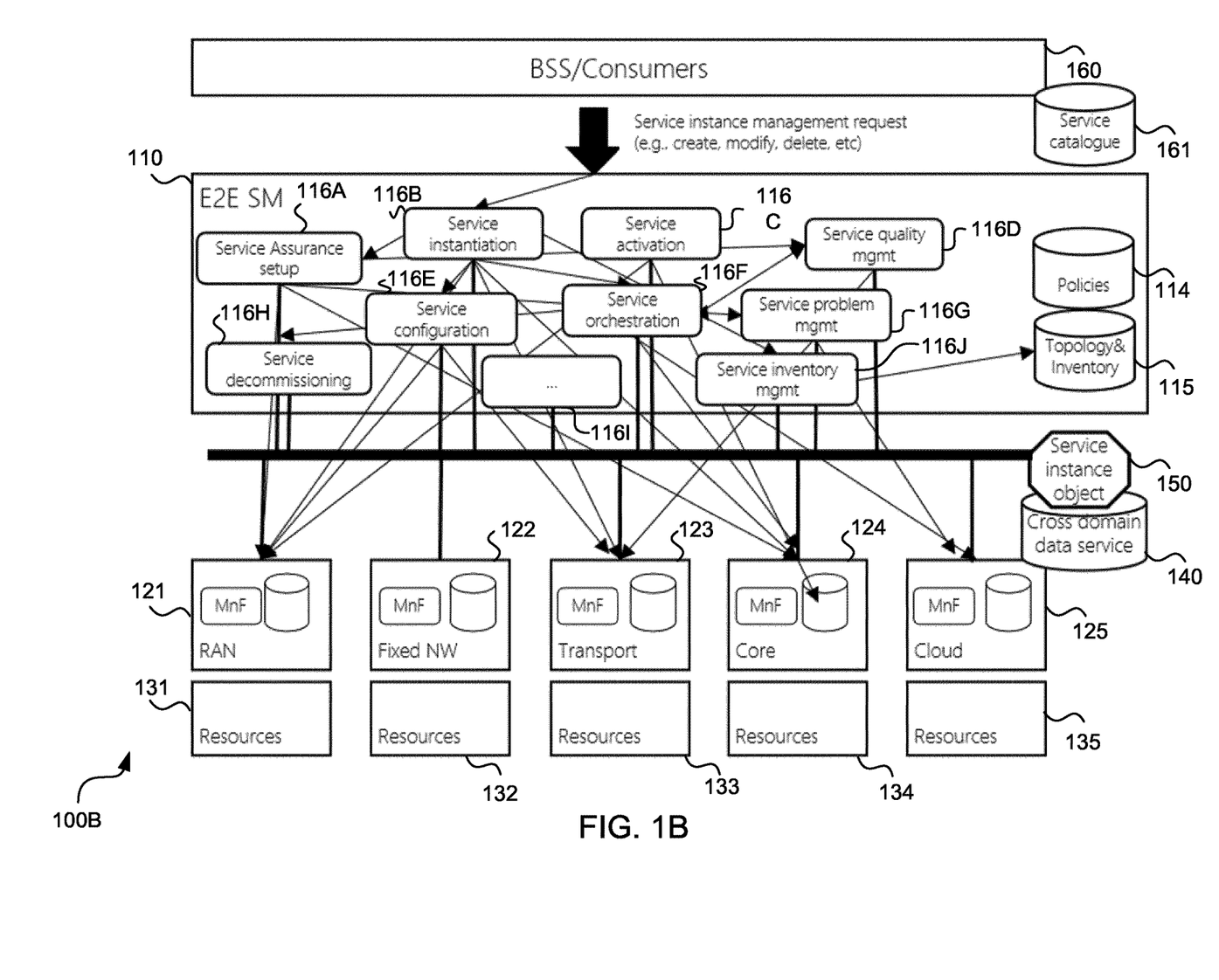
FIG. 1B illustrates using an E2E service instance object in an E2E service rollout scenario.

Diagram 100B of FIG. 1B shows an overall scenario with various actors and the E2E service instance object extending the communication and interaction of the service management functions.

Diagrams 100A, 100B include a service management entity 110 of a network and service management system (which may comprise in at least some embodiments an end-to-end, E2E, network and service management system, such as a zero-touch network and service management, ZSM, system) which includes example E2E service processes 111, 112. Diagrams 100A, 100B further include management domain components radio access network (RAN) management 121, fixed network management 122, transport network management 123, core network management 124, and cloud service management 125, as well as their respective resources 131 to 135.

Service processes 111, 112 may invoke several components in terms of E2E service management functionality, and they may interact with their management domain counterparts 121-125. The processes 111, 112 may consume management services, such as orchestration services, data collection services and analytics services.

Diagrams 100A, 100B further include a cross-domain data service 140, and a service instance object (such as an E2E service instance object) 150 that conforms to a computer-implemented data structure 300 (described in more detail below in connection with FIG. 3).

Diagram 100B further includes a customer or a consumer (such as a business support system (BSS)) 160 of the service management entity 110 and its associated service catalogue 161. Diagram 100B further includes policy data 114, and topology and inventory data 115 of the service management entity 110, as well as various example management services 116A-166J of the service management entity 110.

In the following, various example embodiments will be discussed. At least some of these example embodiments may allow cross-domain service instance data management that allows management processes in the E2E service management and in the management domains to interact and exchange service instance data using a common view provided by an E2E service instance object.

For example, at least some of the example embodiments may allow an end-to-end (E2E) service instance object as a representation of a specific service instance that holds data about the service instance for the related domains. This service instance object may provide a view of the service across various interface standardization families (such as 3rd Generation Partnership Project (3GPP) for a radio access network, Internet Engineering Task Force (IETF) for a transport network, network function virtualization (NVF) for cloud services) by providing object sub-structures close to the representation in each standard family.

Furthermore, at least some of the example embodiments may allow cross-domain data management hosted by the cross-domain data service as a mechanism that exposes the E2E service instance object. The cross-domain data management may provide information about the service instance and a mechanism through which different management services may configure the service instance.

Furthermore, at least some of the example embodiments may allow configuring a service instance in a common way using the E2E service instance object. Different management domains may be allowed domain-specific ways of configuring a service based on a common data management framework provided by the E2E service instance object.

The cross-domain data management may provide capabilities for management processes in the E2E service management and in the management domains to allow status checks of the service instance in different service phases (such as during instantiation, fulfilment, setup of assurance, etc.) using the E2E service instance object.

At least some of the example embodiments may interacting between independent E2E service allow lifecycle processes. Furthermore, at least some of the example embodiments may allow exchanging normalized service instance data between E2E processes, such as between service processes 111 and 112 in the example of FIG. 1A. At least some of the example embodiments may use (but are not limited to) a call-by-reference data exchange.

Furthermore, at least some of the example embodiments may allow interaction between E2E service lifecycle processes and management domain components, thereby allowing sharing of normalized service instance data between an E2E domain and management domain (s), such as between service process 111 and management domain components 121-125 in the example of FIG. 1A. In addition, at least some of the example embodiments may allow a service instance object 150 which may be used as input for standardization of data and object models, such as zero-touch network and service management (ZSM), 3GPP, etc.

In addition, at least some of the example embodiments may allow extending the ETSI ZSM architecture in a way that a service instance object is introduced as an interaction object for E2E management processes.

At least in some of the example embodiments, the E2E service instance object 150 may be accessible from each of the E2E service management processes 111, 112. The object 150 may store and provide information along the E2E lifecycle of a service instance.

At least in some of the example embodiments, the E2E service management may utilize a generalized approach to combine and manage service artefacts which may implement various standards families in terms of provisioning, configuration and operations. Thus, at least some of the example embodiments may allow an E2E service instance object that serves as a base for service-related management activities across different domains.

Figure 3:
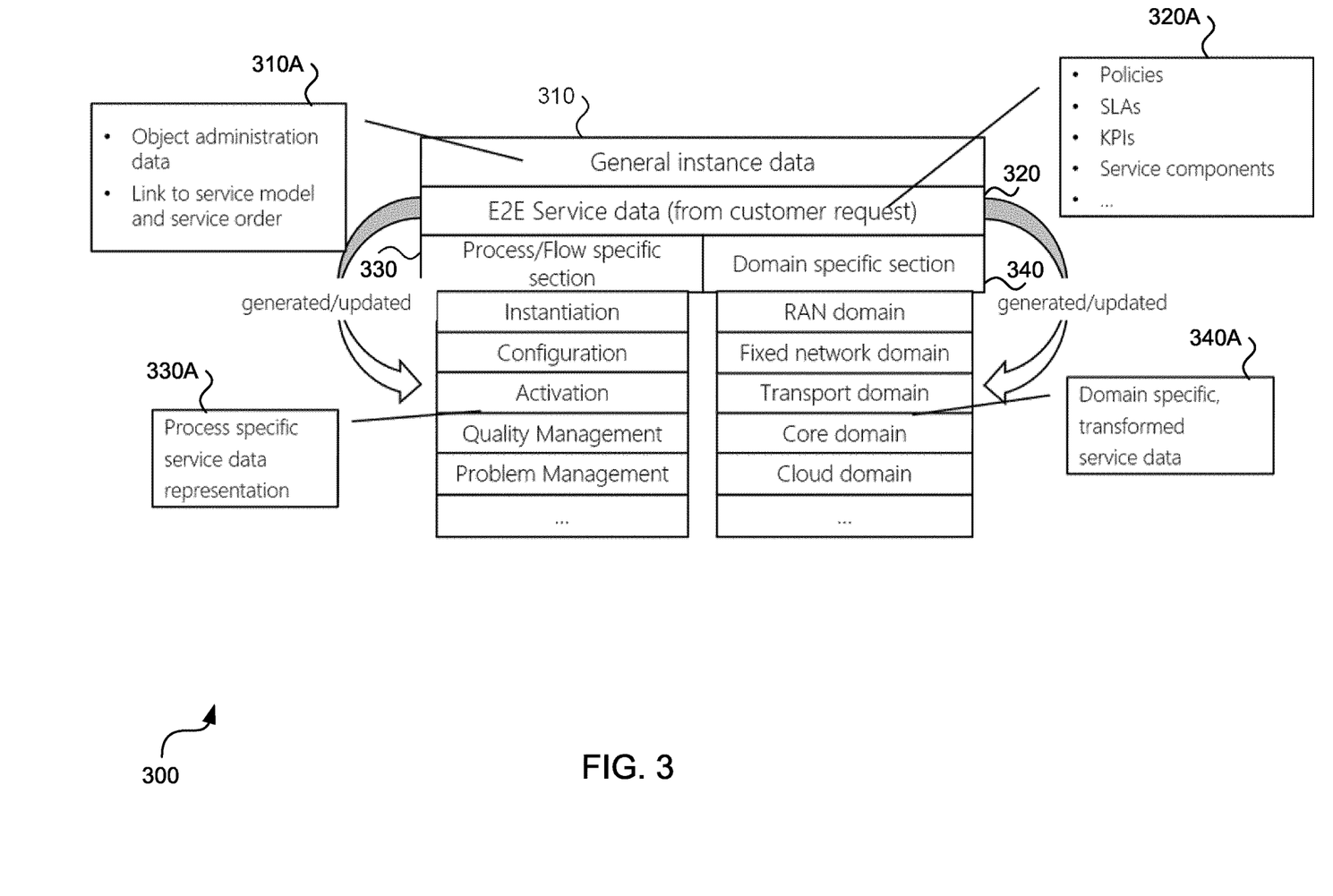
FIG. 3 shows an example embodiment of the subject matter described herein illustrating a computer-implemented data structure for a service instance object of a network and service management system.

FIG. 3 shows an example embodiment of the subject matter described herein illustrating a computer-implemented data structure 300 for a service instance object 150 of the network and service management system.

The computer-implemented data structure 300 comprises a first data section 310 that is configured to store general service instance data. The general service instance data may comprise, e.g., service instance object administration data (e.g. an instance identification), a link to a service model, and/or a link to a service order, as illustrated by box 310A. In other words, the general service instance data describes the object administration.

The computer-implemented data structure 300 further comprises a second data section 320 that is configured to store E2E service data. The E2E service data may comprise data related to, e.g., a service policy, a service level agreement (SLA), a key performance indicator (KPI), and/or a service component, as illustrated by box 320A. In other words, the E2E service data may comprise data that reflects a customer service request data.

The computer-implemented data structure 300 further comprises a third data section 330 that is configured to store E2E service process flow specific data. The E2E service process flow specific data comprises data related to an E2E service management procedure associated with the E2E service process flow. For example, the E2E service management procedure associated with the E2E service process flow may comprise E2E service instantiation, E2E service configuration, E2E service activation, E2E service quality management, E2E service problem management, E2E service scaling, and/or E2E service optimization, as indicated by box 330A.

The computer-implemented data structure 300 further comprises a fourth data section 340 that is configured to store management domain specific data. The management domain specific data comprises data related to a management domain. For example, the management domain may comprise a radio access network management domain 121, a fixed network management domain 122, a transport network management domain 123, a core network management domain 124, a cloud service management domain 125, and/or an edge management domain, as indicated by box 340A.

Figure 4:
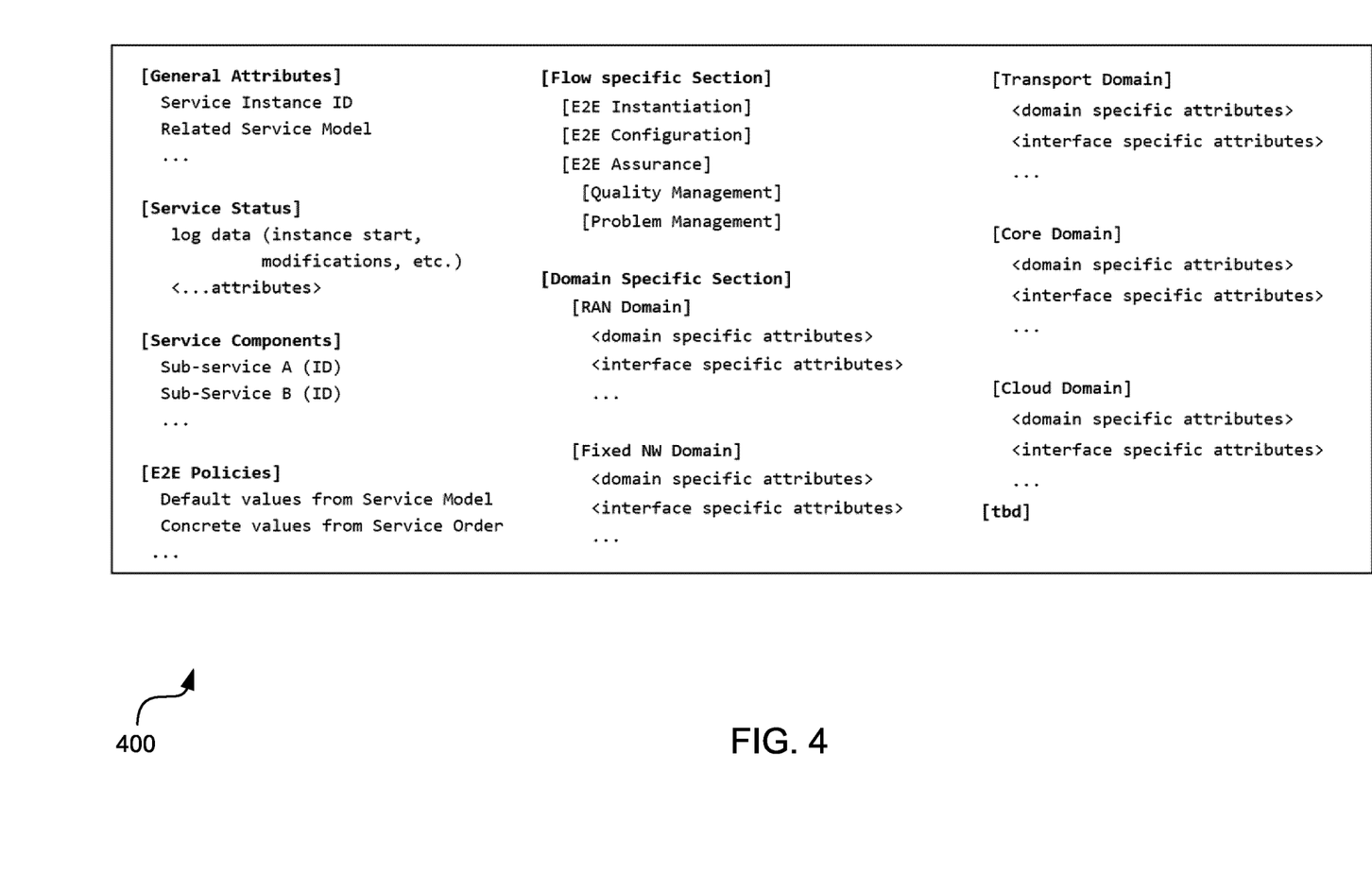
FIG. 4 shows an example data structure of the E2E service instance object.

In other words, the service instance object 300 is a globally managed and accessible object shared with management functions of the actors. Diagram 400 of FIG. 4 shows an example data structure of the service instance object.

In at least some embodiments, the computer-implemented data structure 300 may be configured to be stored in a cross-domain data services entity, e.g., of the E2E ZSM system.

Figure 2A:
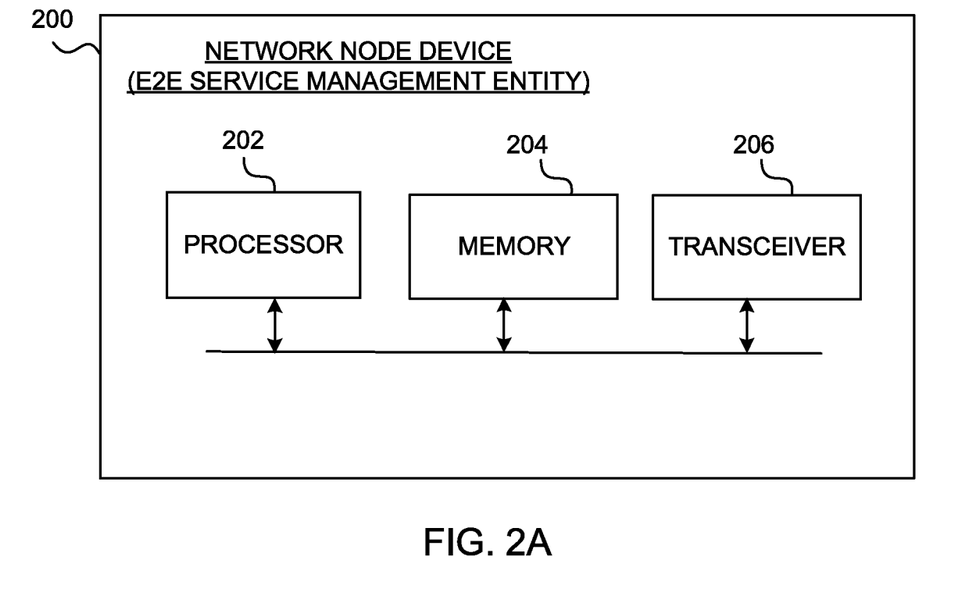
FIG. 2A shows an example embodiment of the subject matter described herein illustrating a network node device associated with an E2E service management entity.

FIG. 2A is a block diagram of a network node device 200 associated with an end-to-end, E2E, service management entity 110 of a network and service management system.

The network node device 200 comprises one or more processors 202 and one or more memories 204 that comprise computer program code. The network node device 200 may also include other elements, such as a transceiver 206, as well as other elements not shown in FIG. 2A.

Although the network node device 200 is depicted to include only one processor 202, the network node device 200 may include more processors. In an embodiment, the memory 204 is capable of storing instructions, such as an operating system and/or various applications. Furthermore, the memory 204 may include a storage that may be used to store e.g. at least some of the information data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The at least one memory 204 and the computer program code are configured to, with the at least one processor 202, cause the network node device 200 to perform receiving a request to instantiate a cross-domain E2E service. In other words, the initial trigger may come from a customer request to instantiate a new service.

In response, the at least one memory 204 and the computer program code are further configured to, with the at least one processor 202, cause the network node device 200 to perform generating a service instance object 150 associated with the requested cross-domain E2E service. The service instance object 150 conforms to the computer-implemented data structure 300 of FIG. 3. In other words, the E2E service instance object 150 may be generated during service instantiation based on default parameters of the associated service model, and/or the dedicated values for this instance based on the associated service order.

The at least one memory 204 and the computer program code are further configured to, with the at least one processor 202, cause the network node device 200 to perform initializing the generated service instance object 150 based on initialization data included in the received request. For example, the initialization data may comprise at least one default parameter of a service model of the cross-domain E2E service, and/or at least one dedicated value for the cross-domain E2E service instance.

The at least one memory 204 and the computer program code may be further configured to, with the at least one processor 202, cause the network node device 200 to perform storing the initialized service instance object 150 in a cross-domain data services entity 140 of the network and service management system.

In other words, the service instance object 150 may be generated during service instantiation. The object 150 as such may be maintained and stored with the cross-domain data services entity 140.

In at least some embodiments, access to given sections of the service instance object 150 may be limited (e.g., read-only) based on the actor/role. The data in the service instance object 150 may be extended for further use cases, e.g., for adding charging relevant data gathered during the service instance life cycle.

The at least one memory 204 and the computer program code may be further configured to, with the at least one processor 202, cause the network node device 200 to perform transmitting a request to initiate the cross-domain E2E service to a management domain entity 121, 122, 123, 124 or 125. The request may comprise a reference to the service instance object 150 associated with the cross-domain E2E service.

The at least one memory 204 and the computer program code may be further configured to, with the at least one processor 202, cause the network node device 200 to perform receiving acknowledgement information from the management domain entity 121, 122, 123, 124 or 125. The acknowledgement information may comprise information related to at least one service action performed by the management domain entity 121, 122, 123, 124 or 125 based on the transmitted request to initiate the cross-domain E2E service.

The at least one memory 204 and the computer program code may be further configured to, with the at least one processor 202, cause the network node device 200 to perform updating the service instance object 150 based on the received acknowledgement information.

Figure 2B:
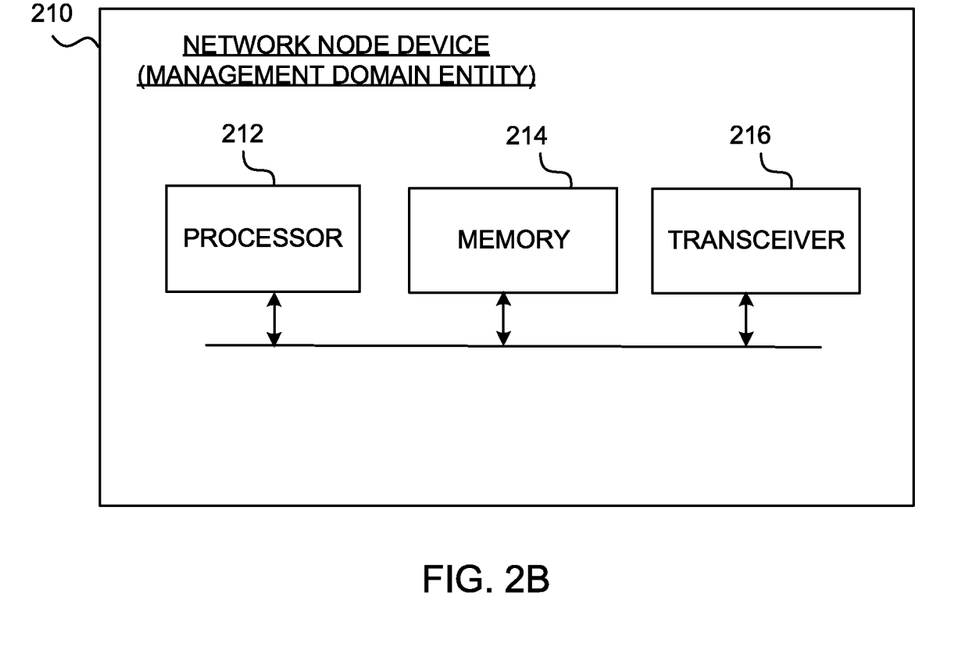
FIG. 2B shows an example embodiment of the subject matter described herein illustrating a network node device associated with a management domain entity.

FIG. 2B is a block diagram of a network node device 210 associated with a management domain entity 121, 122, 123, 124 or 125 of a network and service management system.

The network node device 210 comprises one or more processors 212 and one or more memories 214 that comprise computer program code. The network node device 210 may also include other elements, such as a transceiver 216, as well as other elements not shown in FIG. 2B.

Although the network node device 210 is depicted to include only one processor 212, the network node device 210 may include more processors. In an embodiment, the memory 214 is capable of storing instructions, such as an operating system and/or various applications. Furthermore, the memory 214 may include a storage that may be used to store e.g. at least some of the information and data used in the disclosed embodiments.

Furthermore, the processor 212 is capable of executing the stored instructions. In an embodiment, the processor 212 may be embodied as a multi-core processor, a single core processor, or a combination of one or more multi-core processors and one or more single core processors. For example, the processor 212 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 212 may be configured to execute hard-coded functionality. In an embodiment, the processor 212 is embodied as an executor of software instructions, wherein the instructions may specifically configure the processor 212 to perform the algorithms and/or operations described herein when the instructions are executed.

The memory 214 may be embodied as one or more volatile memory devices, one or more non-volatile memory devices, and/or a combination of one or more volatile memory devices and non-volatile memory devices. For example, the memory 214 may be embodied as semiconductor memories (such as mask ROM, PROM (programmable ROM), EPROM (erasable PROM), flash ROM, RAM (random access memory), etc.).

The at least one memory 214 and the computer program code are configured to, with the at least one processor 212, cause the network node device 210 to at least perform receiving from the E2E service management entity 110 a request to initiate a cross-domain E2E service. The request comprises a reference to a service instance object 150 associated with the cross-domain E2E service. The service instance object 150 conforms to the computer-implemented data structure 300 of FIG. 3.

The at least one memory 214 and the computer program code are further configured to, with the at least one processor 212, cause the network node device 210 to perform accessing service instance data in the referred service instance object 150.

The at least one memory 214 and the computer program code are further configured to, with the at least one processor 212, cause the network node device 210 to perform at least one service action based on the accessed service instance data.

The at least one memory 214 and the computer program code may be further configured to, with the at least one processor 212, cause the network node device 210 to perform transmitting acknowledgement information to the E2E service management entity 110. The acknowledgement information may comprise information related to the performed at least one service action.

The at least one memory 214 and the computer program code may be further configured to, with the at least one processor 212, cause the network node device 210 to perform updating the service instance object 150 based on the performed at least one service action.

In other words, E2E service processes and management domain components may access the service instance object 150 and read/write/append data as needed. Furthermore, the service instance object 150 may be maintained by E2E service management functions as well as management domain management functions. Each actor (invoking further process entities) may refer in the invocation call to the service instance object 150. Each actor (process entities like fulfilment, assurance, domain functions, etc.) on the service may access the service instance object 150 and read/write/append data as needed. Furthermore, at least in some embodiments concurrent access to the service instance object 150 may be allowed.

Figure 5A:
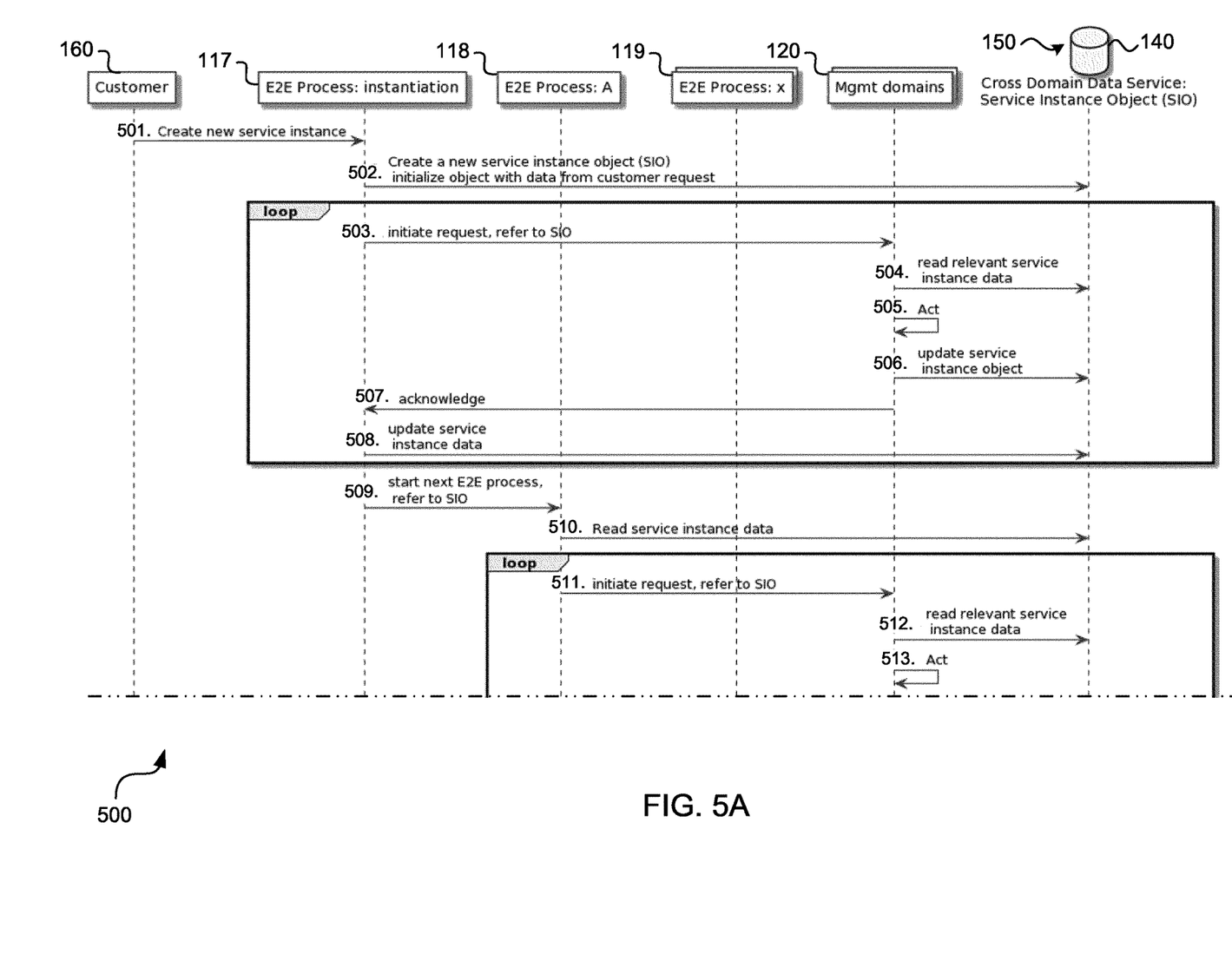
FIGS. 5A to 5B show an example embodiment of the subject matter described herein illustrating a method.
Figure 5B:
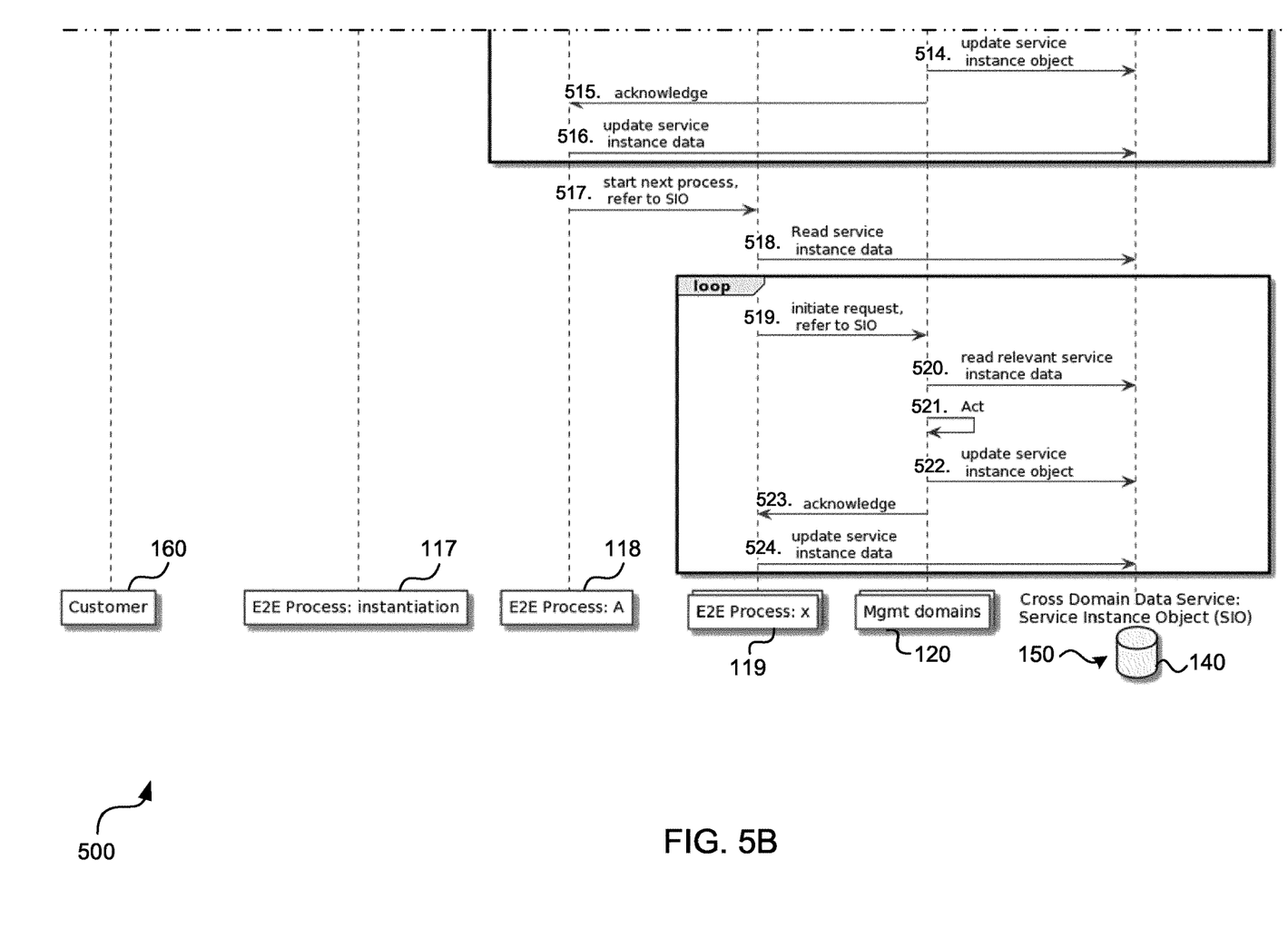

FIGS. 5A to 5B illustrate an example signalling diagram 500 of a method related to a service instance object 150 of a network and service management in accordance with an example embodiment. FIG. 5B is a direct continuation of FIG. 5A.

At operation 501, a request for instantiation 117 of a cross-domain E2E service is received at the network node device 200 associated with the E2E service management entity 110 of the network and service management system. In other words, a request from a customer 160 may come in for instantiation 117 of a new service.

In response, at operation 502, a service instance object 150 associated with the requested cross-domain E2E service is generated by the network node device 200. The service instance object 150 conforms to the computer-implemented data structure 300 of FIG. 3. Further at operation 502, the generated service instance object 150 is initialized by the network node device 200 based on initialization data included in the received request. In other words, the E2E process instantiation 117 may create a new service instance object 150 and initialize the object values based on the parameters coming along with the customer request. Further at operation 502, the initialized service instance object 150 may be caused by the network node device 200 to be stored in the cross-domain data services entity 140 of the network and service management system.

At operation 503, a request to initiate a cross-domain E2E service is transmitted by the network node device 200 to a management domain entity 120 (which may comprise any of management domain entities 121, 122, 123, 124 and/or 125). The request comprises a reference to the service instance object 150 associated with the cross-domain E2E service. As discussed above, the service instance object 150 conforms to the computer-implemented data structure 300 of FIG. 3. In other words, the E2E process may invoke management domain components (e.g. RAN and/or core network), e.g., via a procedure call. The procedure call may include a reference to the service instance object (SIO) 150.

Further at operation 503, the request to initiate the cross-domain E2E service is received at the network node device 210 associated with the management domain entity 120 of the network and service management system.

At operation 504, service instance data in the referred service instance object 150 is accessed by the network node device 210. In other words, the management domain component or entity 120 may access the SIO 150 and read the relevant parameters for its own domain, e.g., how to setup local assurance policies.

At operation 505, the network node device 210 performs at least one service action based on the accessed service instance data. In other words, the management domain component 120 may act inside the domain according to the read data from the SIO 150.

At optional operation 506, the network node device 210 may update the service instance object 150 based on the performed at least one service action. In other words, the management domain component 120 may optionally update the SIO 150, e.g., add activated policies. This data may be read by other E2E processes later.

At optional operation 507, the network node device 210 may transmit acknowledgement information to the network node device 200 associated with the E2E service management entity 110. The acknowledgement information may comprise information related to the performed at least one service action. Further at operation 507, the network node device 200 receives the acknowledgement information from the network node device 210 associated with the management domain entity 120. In other words, the management domain component 120 may acknowledge the activities to the calling E2E process 117.

At optional operation 508, the network node device 200 may update the service instance object 150 based on the received acknowledgement information. In other words, the E2E process instantiation 117 may update the SIO 150 as well, according to the modifications and setup of the service instance.

At optional operation 509, the E2E process 117 may invoke a next E2E process 118, e.g., assurance setup. In this case, there may also be the reference to the SIO 150 included in the procedure call.

At optional operations 510 to 524, the above described interaction pattern may be repeated for interactions between E2E service processes 118, 119, or for interactions between E2E service processes 118, 119 and management domain components 120.

At least portions of the method of diagram 500 may be performed by the network node device 200 of FIG. 2A and the network node device 210 of FIG. 2B. The operations 501 to 503, 507 to 511, 515 to 519, and/or 523 to 524 can, for example, be performed by the at least one processor 202 and the at least one memory 204. The operations 504 to 507, 512 to 515, and/or 520 to 523 can, for example, be performed by the at least one processor 212 and the at least one memory 214. Further features of the method of diagram 500 directly result from the functionalities and parameters of the network node device 200 and the network node device 210, and thus are not repeated here. The method of diagram 500 can be performed by computer program (s).

At least some of the embodiments described herein may allow the E2E service instance object to be commonly used between the actors in the E2E service management domain and the management domains.

At least some of the embodiments described herein may allow domain specific sections of the E2E service instance object to be used to handle process specific or domain specific aspects of the service.

At least some of the embodiments described herein may allow the E2E service instance object to facilitate in bridging the gap between different interface standardization families (such as 3rd Generation Partnership Project (3GPP) for a radio access network, Internet Engineering Task Force (IETF) for a transport network, network function virtualization (NVF) for cloud services) by providing object substructures close to the representation in each standard family.

The functionality described herein can be performed, at least in part, by one or more computer program product components such as software components. According to an embodiment, the network node device 200 and/or the network node device 210 may comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of utilizing a service instance object at an end-to-end, E2E, service management entity of a network and service management system, the method comprising:
   causing, by a processor, a request to initiate a cross-domain E2E service to be transmitted to a management domain entity, the request comprising a reference to a service instance object associated with the cross-domain E2E service, the service instance object conforming to a computer-implemented data structure comprising:
      a first data section, configured to store general service instance data,
      a second data section, configured to store E2E service data,
      a third data section, configured to store E2E service process flow specific data comprising data related to an E2E service management procedure associated with the E2E service process flow, and
      a fourth data section, configured to store management domain specific data comprising data related to a management domain;
   receiving, at the processor, acknowledgement information from the management domain entity, the acknowledgement information comprising information related to at least one service action performed by the management domain entity based on the transmitted request to initiate the cross-domain E2E service; and
   causing, by the processor, the service instance object to be updated based on the received acknowledgement information.

2. A method of utilizing a service instance object at a management domain entity of a network and service management system, the method comprising:
   receiving, at a processor from an end-to-end, E2E, service management entity, a request to initiate a cross-domain E2E service, the request comprising a reference to a service instance object associated with the cross-domain E2E service, the service instance object conforming to a computer-implemented data structure comprising:
      a first data section, configured to store general service instance data,
      a second data section, configured to store E2E service data,
      a third data section, configured to store E2E service process flow specific data comprising data related to an E2E service management procedure associated with the E2E service process flow, and
      a fourth data section, configured to store management domain specific data comprising data related to a management domain;
   accessing, by the processor, service instance data in the referred service instance object;
   performing at least one service action based on the accessed service instance data; and
   causing, by the processor, the service instance object to be updated by accessing the service instance object and appending data indicating one or more activated policies based on the performed at least one service action.

3. The method according to claim 2, further comprising:
   causing, by the processor, acknowledgement information to be transmitted to the E2E service management entity, the acknowledgement information comprising information related to the performed at least one service action.

4. A network node device associated with an end-to-end, E2E, service management entity of a network and service management system, the network node device comprising:
   at least one processor; and
   at least one memory including computer program code;
   the at least one memory and the computer program code configured to, with the at least one processor, cause the network node device to at least perform:

receiving a request to instantiate a cross-domain E2E service; and in response, generating a service instance object associated with the requested cross-domain E2E service, the service instance object conforming to a computer-implemented data structure comprising:

a first data section, configured to store general service instance data, a second data section, configured to store E2E service data, a third data section, configured to store E2E service process flow specific data comprising data related to an E2E service management procedure associated with the E2E service process flow, and a fourth data section, configured to store management domain specific data comprising data related to a management domain;

initializing the service instance object based on initialization data included in the received request;

transmitting a request to initiate the cross-domain E2E service to a management domain entity, the request comprising a reference to the service instance object associated with the cross-domain E2E service;

receiving acknowledgement information from the management domain entity, the acknowledgement information comprising information related to at least one service action performed by the management domain entity based on the transmitted request to initiate the cross-domain E2E service; and updating the service instance object based on the received acknowledgement information.

5. The network node device according to claim 4, wherein the at least one memory and the computer program code are further configured to, with the at least one processor, cause the network node device to at least perform:

storing the initialized service instance object in a cross-domain data services entity of the network and service management system.

6. The network node device according to claim 4, wherein the initialization data comprises at least one of: at least one default parameter of a service model of the cross-domain E2E service, or at least one dedicated value for the cross-domain E2E service instance.

7. The network node device according to claim 4, wherein the general service instance data comprises at least one: service instance object administration data, a link to a service model, or a link to a service order.

8. The network node device according to claim 4, wherein the E2E service data comprises data related to at least one: a service policy, a service level agreement, a key performance indicator, or a service component.

9. The network node device according to claim 4, wherein the computer-implemented data structure is configured to be stored in a cross-domain data services entity of the network and service management system.

10. The network node device according to claim 4, wherein the E2E service management procedure associated with the E2E service process flow comprises at least one of: E2E service instantiation, E2E service configuration, E2E service activation, E2E service quality management, E2E service problem management, E2E service scaling, or E2E service optimization.

11. The network node device according to claim 4, wherein the management domain comprises at least one of: a radio access network management domain, a fixed network management domain, a transport network management domain, a core network management domain, a cloud service management domain, or an edge management domain.

* * * * *